United States Patent [19]

Quackenbush

[11] 4,056,369
[45] Nov. 1, 1977

[54] METHOD OF AND APPARATUS FOR THE RECOVERY OF A DESIRED MATERIAL FROM A CARRIER STREAM

[76] Inventor: Henry Quackenbush, 200 Ridgewood Place, Mobile, Ala. 36608

[21] Appl. No.: 635,107

[22] Filed: Nov. 25, 1975

[51] Int. Cl.² .......................................... B01D 51/06
[52] U.S. Cl. .......................................... 55/58; 55/74; 208/262
[58] Field of Search ................. 55/57, 58, 74, 75, 387, 55/179, 180, 189; 208/262

[56] References Cited

U.S. PATENT DOCUMENTS

| 1,661,149 | 2/1928 | Barnebey | 55/58 |
|---|---|---|---|
| 3,309,844 | 3/1967 | Hemstreet et al. | 55/75 |
| 3,768,232 | 10/1973 | Farber et al. | 55/58 |
| 3,867,111 | 2/1975 | Knowles | 55/58 X |
| 3,874,427 | 4/1975 | Tiggelbeck | 55/387 X |

*Primary Examiner*—Wilbur L. Bascomb, Jr.
*Assistant Examiner*—E. Rollins Cross
*Attorney, Agent, or Firm*—Burns, Doane, Swecker & Mathis

[57] ABSTRACT

A process and apparatus for recovering gasoline or other solvents from solvent laden air is disclosed. The solvent laden air is contacted at ambient pressure and temperature in a vessel with a mixture of an adsorbent for the desired material, e.g., activated charcoal, and an inert compound possessing a high heat capacity, e.g., aluminum oxide. After the adsorbent is essentially saturated with the solvent, flow of solvent laden air into the vessel is terminated. The mixture of materials in the vessel is then heated by indirect heat exchange (e.g., steam coils buried in the mixture) to a temperature below the vaporization temperature of the solvent thereby indirectly treating the solvent adsorbed on the material. A pump is then operated to draw the air from the vessel at a rate that reduces the pressure in the vessel sufficiently to vaporize the solvent. Thus, substantially all of the solvent is drawn out of the vessel with the air. Afterward, the vessel is cooled to ambient temperature and the process can be repeated. The solvent in the air that is drawn off from the vessel may be recovered by subsequent treatment. A plurality of vessels may be utilized to effect continuous treatment of the solvent laden air.

23 Claims, 2 Drawing Figures

METHOD OF AND APPARATUS FOR THE RECOVERY OF A DESIRED MATERIAL FROM A CARRIER STREAM

BACKGROUND OF THE INVENTION

In many industrial processes, mixtures of air and condensible vaporous materials such as gasoline, halogenated hydrocarbon solvents and the like, are produced. The recovery of the condensible vaporous materials for disposal or reuse is ordinarily an economic and ecological necessity.

In the past, recovery has been effected by the use of a solid adsorbent or desiccant such as activated carbon. The usual adsorption system of this type comprises one or more adsorber vessels containing the adsorbent arranged so that gasoline or solvent vapor-laden air to be treated travels through a bed of the adsorbent whereby the gasoline or solvent vapors are adsorbed and the thus-purified air is exhausted to the atmosphere. When the adsorbent has become substantially saturated with the gasoline or solvent, the influx of the vapor laden air is terminated, and the adsorbed material is driven off by heating and/or applying a vacuum to the absorbent bed. The solvent is then recovered by passing the effluent stream into suitable condensing apparatus.

Where live steam is the sole source of heat as in U.S. Pat. No. 2,211,162 and no vacuum is applied, an additional drying step for the adsorbent material is necessary thereby increasing the duration of a complete cycle. Where live steam is used in combination with a vacuum to achieve desorbtion, the steam condenses as water on the adsorbent bed, the temperature of the bed rapidly falls below the vaporization temperature of the condensed vapor and complete recovery can not be effected. A similar result (i.e., rapid decrease of bed temperature during recovery resulting in incomplete removal of the condensed vapors) occurs when the adsorbent bed is heated other than with live steam and a vacuum is applied. The adsorbent material has a low specific heat and does not act as an effective heat sink to counteract the loss of heat while a vacuum is being drawn.

Incomplete recovery of the condensed material leads to the possible release of the material to the atmosphere during the next adsorption cycle, more frequent regenerations and periodic regeneration of the adsorbent at relatively high temperatures without recovery of the condensed material. Thus, recovery methods as practiced by the prior art are inefficient and may be accompanied by pollution of the environment. Vapor recovery systems heretofore proposed are illustrated by U.S. Pat. Nos. 1,717,103; 2,211,162; 2,975,860; 3,225,516; 3,355,860; and 3,883,325.

OBJECTS AND SUMMARY OF THE INVENTION

It is an object of the present invention to provide a method and apparatus for the recovery of a condensable material from an air stream containing said material which avoids or alleviates the problems of the prior art.

Another object of the present invention is to provide a process for the recovery of a condensable vapor utilizing a regenerable bed which permits relatively complete regenerations of the bed and relatively long periods of use between regenerations.

It is a further object of the present invention to provide a continuous, high efficiency process for the recovery of gasoline or the like from an air stream laden with gasoline vapor.

These and other objects, as well as the scope, nature and utilization of the invention will be apparent to those skilled in the art from the following description and appended claims.

In one aspect, the invention relates to a process for recovering gasoline and the like from a stream of air laden with gasoline, and includes conducting the stream of air through an enclosed vessel containing an adsorbent material for the gasoline, so that the gasoline is adsorbed within the vessel while the air passes through an outlet to the atmosphere. When the adsorbent material is substantially saturated, the vessel is closed so that it no longer receives the stream of air laden with gasoline and does not discharge air from the vessel to the atmosphere. The interior of the vessel is then heated at approximately atmospheric pressure to a temperature below the boiling point of the gasoline. The pressure in the vessel is then reduced by withdrawing air from the vessel. When the pressure has dropped sufficiently to reach the boiling point for the gasoline at the temperature in the vessel, the gasoline vaporizes and passes out of the vessel to the vacuum source. The interior of the vessel is maintained at that temperature during the evacuation process, preferably by the presence of an inert material having a high specific heat disposed within the vessel. The gasoline or halogenated hydrocarbon that is withdrawn from the vessel during the evacuation step is subsequently condensed and recovered. After a period of time, the gasoline is almost entirely removed from the adsorbed material and the process can then be repeated.

The apparatus in accordance with this invention includes a vessel containing adsorbent material. Preferably, the vessel contains, in addition to the adsorbent material, sufficient inert material of high specific heat which serves as a heat sink to resist the tendency of the adsorbent material to lose heat during the evacuation step. The vessel has an inlet conduit and an outlet conduit and valves in each conduit for controlling the flow into and out of the vessel. A return conduit communicates between the inlet and outlet conduit and flow in the return conduit is controlled by the respective valves. A detecting device in the outlet conduit measures the proportion of gasoline or halogenated hydrocarbon in the air that leaves the vessel. The detecting device includes control means for closing the inlet and outlet valves. A circulation fan is provided to circulate air through the vessel and through the return conduit, and heat is applied, preferably by a steamheating coil embedded in the adsorbent material. A vacuum pump, preferably of the liquid ring type, is connected with the vessel through a separate conduit. When the selected temperature is reached, the vacuum pump is started, thereby drawing air from the vessel to reduce the pressure in the vessel. While the pump is operating, a heat exchanger upstream from the pump cools the air stream, and the gasoline or halogenated hydrocarbon in the air stream condenses. Down stream from the pump, the condensate is collected and recovered.

BRIEF DESCRIPTION OF THE DRAWINGS

A preferred embodiment of the invention is illustrated in the accompanying drawings in which the FIG. 1 is a side elevational view, partially in cross sections showing the apparatus of this invention utilizing a pair of adsorbers connected in series.

DESCRIPTION OF THE PREFERRED EMBODIMENTS

Figure 1:
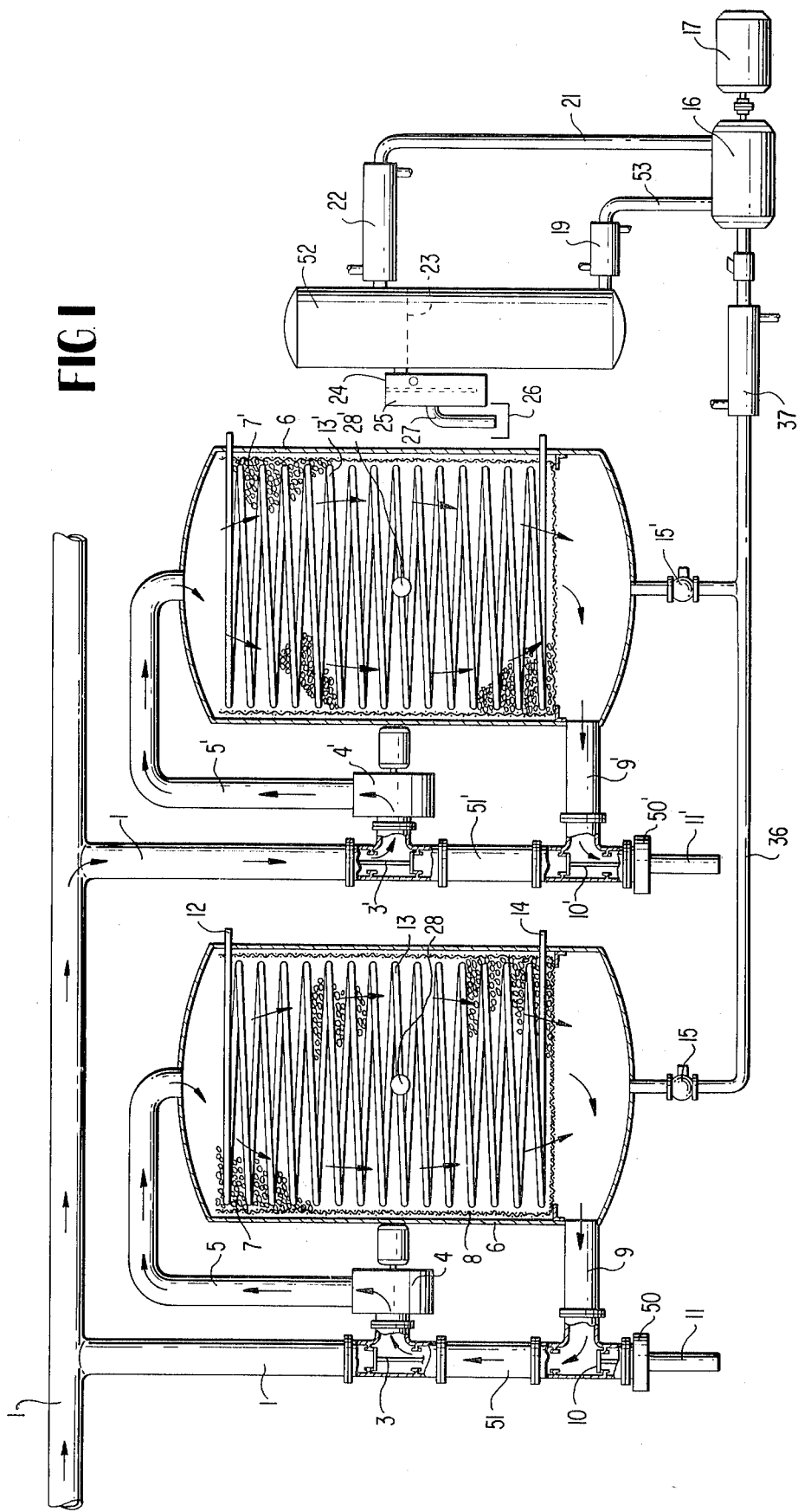

With reference to FIG. 1, a pair of adsorber vessels 6 and 6' are provided. Each vessel contains a bed 7, 7' of solid adsorbent having intimately admixed therewith a suitable high heat capacity material. A partition 8, 8' or other suitable means supports the adsorbent and prevents crushing due to the weight of the materials in the vessel. When gasoline is the solvent that is being recovered, a preferred adsorbent is activated carbon and a preferred high heat capacity material is aluminum oxide.

A stream of solvent laden air is conducted to the apparatus through a conduit 1, 1'. A valve 3, 3' controls the flow between the vessels 6, 6' and their respective supply conduits 1, 1'. A conduit 5, 5' conducts communicates between the valve 3, 3' and the vessel 6, 6'. Each of the conduits 5, 5' includes a blower 4, 4' for circulating fluid through the conduits 5, 5'.

Adjacent to the bottom of the vessel, a discharge conduit 9, 9' is provided. The conduit 9 communicates with a return conduit 51, 51', or with a conduit 11, 11' that is open to the atmosphere. Flow is directed either to the atmosphere or back to the conduit 51, 51' by valve 10, 10'. As shown in FIG. 1, the valves 3, 3' are conventional tee valves which may be selectively operated to allow communication between the conduit 1, 1' and the conduit 5, 5' (open) or between the return conduit 51, 51' and the conduit 5, 5' (closed). Similarly, the valves 10, 10' are conventional tee valves which may be operated in coordination with the respective valves 3, 3' to allow communication between the conduit 9, 9' and the conduit 11, 11' (open), or the conduit 51, 51' (closed). A conventional sensing device 50, 50' is disposed in the conduit 11 to detect the amount of solvent in the air stream flowing to the atmosphere through the conduit 11, 11'. The sensing device 50, 50' operates the valve 10, 10' to stop flow through the conduit 11, 11' and operates the valve 3, 3' to stop flow into the vessel 6, 6' from the conduit 1, 1'.

Each vessel 6, 6' includes steam coils 13, 13' which are embedded in the bed 7, 7' of adsorbent and high heat capacity material. Steam is supplied to the coil through an inlet 12, 12' and is returned by an outlet conduit 14. Steam supplied at the inlet 12, 12' has a temperature that is about 100° F greater than the vaporization temperature of the solvent within the vessel 6, 6' to assure sufficient heat transfer from the steam to the bed 7, 7' to boil off the solvent when the pressure in the vessel is reduced to a high vacuum, preferably between 24" and 28" Hg. The rate of flow of steam is controlled by conventional means to maintain the selected temperature, as measured by a thermocouple 28, in the vessel 6, 6' during the regenerative phase of the cycle. The coils 13, 13' are also connected with a source of cooling water so that the coils may be used selectively to cool the bed 7, 7'.

A vacuum pump 16 is connected to both of the vessels 6, 6' through a vacuum line 36. Preferably, the vacuum pump 16 is of the liquid ring type wherein the solvent liquid serves as part of the seal. As an example of a pump that is suitable for this purpose, Nash Engineering Company manufactures a pump of this type having a suction pressure up to 1 inch of mercury Absolute, with a volume rate of flow at the inlet of about 40 cubic feet per minute. The pump 16 is driven by an electric motor 17. Valves 15, 15' selectively control flow from the respective vessels 6, 6' into the line 36. A condenser 37, preferably of the counter-current type, is provided in the vacuum line 36. Solvent condensate, with a small portion of vapor from the pump 16, flows through line 21 into condenser 22 where the balance of the vapor is condensed. The tank 52 receives liquid from the condenser 22 and the level of liquid 23 is maintained by a suitable control device. The recovered solvent flows from the tank 52 through a line 24 to a water separator 25, from which it flows into a reservoir 26. A portion of the condensed solvent is passed through a heat exchanger 19 and line 53 to provide the liquid seal for the pump 16.

The process of this invention will be described with respect to the two vessels 6 and 6', although it will be understood that this process may readily be adapted for a single vessel, or for more than two vessels. At the start of the cycle, the valve 15 is closed, and the bed 7 in the vessel 6 is at ambient temperature. Solvent laden air is conducted from the conduit 1 through the open valve 3 and through the conduit 5 and into the vessel 6. As the solvent, in the form of microscopic liquid droplets, passes through the bed 7, it is absorbed on the surface of the adsorbent material, and air that is relatively free of solvent flows through the discharge conduit 9 and through the open valve 10 to the atmosphere through the conduit 11. As the process continues, more and more solvent will be adsorbed in the bed 7, and it will become less and less efficient. Consequently, the air flowing out of the vessel through the conduit 9 will be laden with a progressively higher proportion of solvent.

When a preselected level is reached, the sensing device 50 will close the valves 3 and 10, and start the fan 4 to circulate the air through the vessel 6. At the same time, steam is supplied to the coil 13 through the inlet 12 at the proper temperature to heat the bed 7 to a temperature that is equal to the vaporization temperature at a high vacuum. When the temperature of the bed reaches a predetermined temperature, the fan 4 is stopped. The pump 16 is then started and the valve 15 is opened. The valve 15' remains closed.

The pump 16 progressively reduces the pressure in the vessel 6, while the steam in the coil 13 and the high heat capacity material in the bed 7 continue to supply heat to the solvent to maintain the solvent at a temperature that is sufficiently high to vaporize the solvent at a reduced pressure. Ultimately, the pressure becomes sufficiently low to cause vaporization of the solvent, and the solvent laden air passes through the line 36 to the condenser 37 and through the pump 16. Liquid with some vapor is discharged from pump 16 through line 21 into condenser 22 where the balance of the vapor is condensed and the solvent is discharged into vessel 52. A portion of the condensed liquid is passed through conventional condenser 19 and line 53 to provide the liquid seal for pump 16. The liquid level is maintained in vessel 52 at level 23. The recovered liquid flows through line 24 into water separator 25 where residual water is removed. The resulting, dehydrated desired material is removed through line 27 into reservoir 26.

When all the previously adsorbed vapor has been recovered from vessel 6 the adsorbent material is cooled down by flushing cold water through coil 13. The vacuum pump is deenergized, valves 3 and 10 are shifted to their original position and the cycle is repeated.

In a preferred embodiment of the present invention, a plurality of adsorption units are connected in a series to a common inlet feed line as illustrated by line 1, and to a common outlet collecting line as illustrated by line 36, which in turn may be connected to a single vacuum source as illustrated by vacuum pump 16, with each unit operating with cycles of adsorption and desorption. Thus, while one unit is operating in the adsorption mode, the other unit is operating in a desorption mode thereby resulting in a continuous process. Accordingly, when valve 3 and 10 of vessels 6 are in the closed recycle position, the corresponding valves 3' and 10' of the vessel 6' are in the open position permitting intake from line 1 and exhaust to the atmosphere through valve 10' and line 9'. It will be understood by those skilled in the art that three or more units may be placed in series with a plurality of the units being in either the adsorption of desorption cycle.

As noted above, the bed 7 in vessel 6 contains a mixture of an adsorbent for the desired material and an inert high heat capacity material. It has been found that the use of a combination of adsorbent and an inert compound possessing a high heat capacity enables recovery of substantially 100% of the adsorbed material. The mixed bed 7 in vessel 6 should contain sufficient adsorbent material so as to have the capacity to adsorb the desired material from the carrier stream over a prolonged period of time and sufficient inert high heat capacity material to counter-act the temperature reduction which normally would accompany drawing a high vacuum in the vessel 6. The proportion of high heat capacity material to adsorbent material depends upon the actual conditions in the vessel and the particular arrangement utilized to supply heat to the mixed bed 7. The materials of the bed may be of any desired size and shape as is understood and known to the skilled artisan.

The adsorbent material utilized in bed 7 can be any suitable solid material which is an adsorbent for the desired material, which adsorbent materials are generally known in the art, such as activated carbon.

The inert high heat capacity material can be any solid material which does not interfere with the adsorption or desorption cycles and which has a sufficient heat capacity to counteract the withdrawal of heat while the vacuum pump is drawing a vacuum in the vessel for a sufficient length of time to allow removal of substantially all of the material in the bed in the vapor state without recondensation or readsorption of the vapors on the bed. Suitable inert, high heat capacity materials include aluminum oxide or other ceramic materials.

Instead of heating the bed 7 with steam, any other suitable fluid may be utilized. For example, hot compressed air may be conducted through the heating coils 13 in the vessel 6. It is also possible to substitute ammonia as the heating fluid.

The process and apparatus are particularly suited for the recovery of hydrocarbons (e.g., gasoline) and halogenated hydrocarbons (e.g., carbon tetrachloride, perchloroethylene and trichloroethylene) from carrier streams such as air although they are generally useful for the recovery of a condensable vapor or adsorbable liquid which may be adsorbed on a solid adsorbent.

As examples of chlorinated hydrocarbons that are suitable for recovery in this process and apparatus, the following table is provided:

| Chemical | Normal Boiling Point | Boiling Point at Reduced Pressure |
|---|---|---|
| Methylene chloride | 104° F | 500 mm Hg, 86° F |
| Chloroform | 142° F | 260 mm Hg, 86° F |
| Carbon tetrachloride | 170° F | 205 mm Hg, 104° F |
| Trichlorethylene | 189° F | 200 mm Hg, 120° F |
| Perchlorethylene | 250° F | 96 mm Hg, 140° F |
| Freon-112 (see $Cl_2F-CCl_2F$) | 199° F | 5 psi A, 142° F |

The following example is given as a specific illustration of the present invention. It should be understood, however, that the invention is not limited to the specific details set forth in the examples.

EXAMPLE

The apparatus shown and described with respect to FIG. 1 is provided. Each vessel 6, 6' contains a uniform mixture of 50 weight percent activated carbon and 50 weight percent aluminum oxide.

Figure 2:
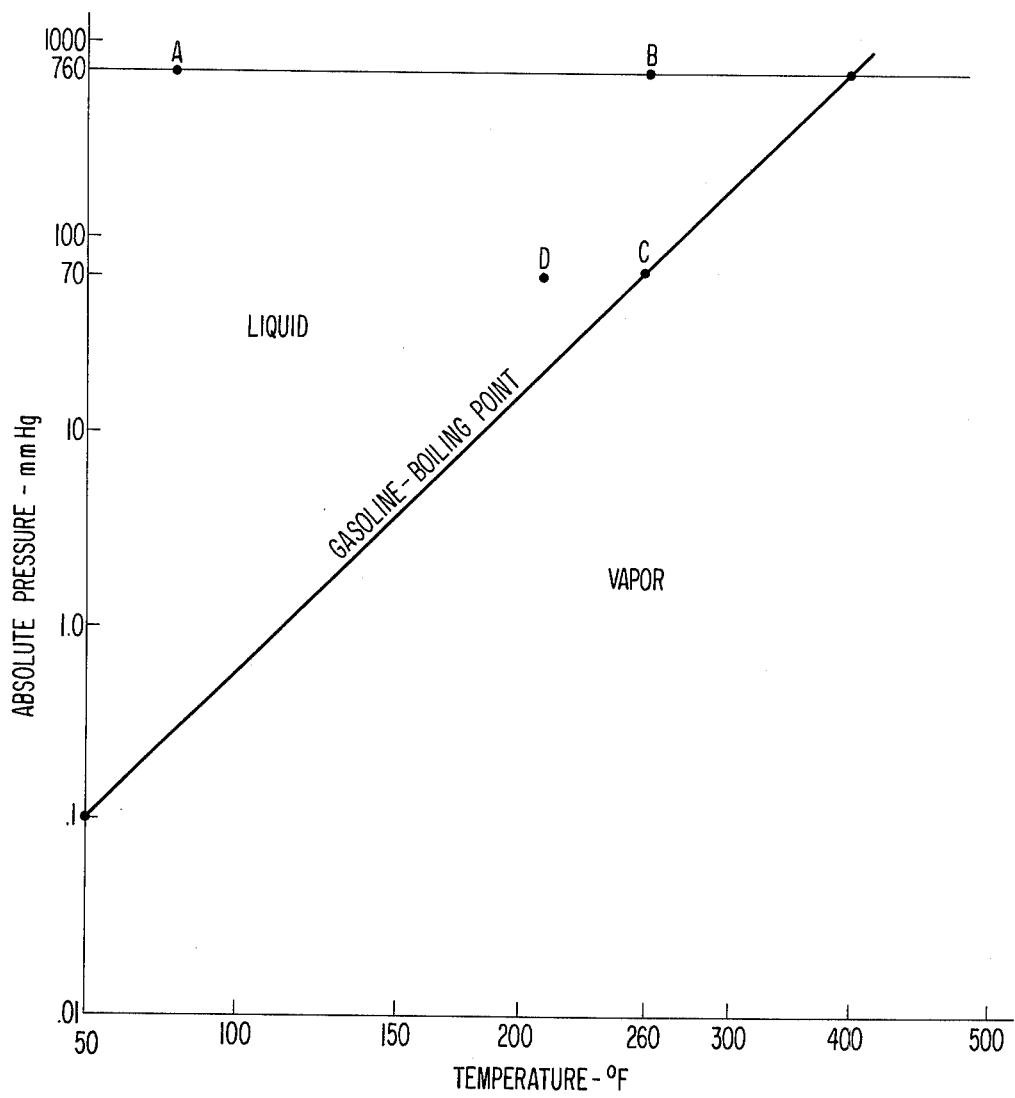
FIG. 2 illustrates the condition of the gasoline at different points.

Air laden with gasoline vapor at approximately atmospheric pressure and temperature is conducted through the conduit 1 and through the valve 3 into the vessel 6. The valve 3' is closed. The valve 10 is open to allow air to flow through the conduit 9 and to the conduit 11 through the sensing device 50. The condition of the gasoline is indicated at the point A in FIG. 2. After a period of time, the detecting means sensed that the amount of gasoline passing through the conduit 11 exceded the predetermined value, and a switch in the detecting device 50 operated the valves 3 and 10 to a closed position. The blower 4 was started to circulate air through the vessel 6. At the same time, the valves 3' and 10' were opened to allow gasoline laden air from the conduit 1 to flow into the second vessel 6'.

Steam at a temperature of about 360° is conducted through the coil 13 in the vessel 6. The temperature of the gasoline which had accumulated on the surface of the carbon and aluminum oxide increased approximately to the point marked B in FIG. 2, 260° F at atmospheric pressure. At this point, the temperature of the gasoline, as well as the activated carbon and aluminum oxide, have been heated to the point marked B in FIG. 2. This temperature is about 140° below the normal boiling point for the gasoline. The temperature inside the vessel 6 is measured by the thermocouple 28, which controls the rate of flow of steam through the coil 13.

The vacuum pump 16 was then started and the valve 15 was opened. The pressure in the vessel proceeded to drop. When the pressure reached approximately 70 millimeters absolute, the gasoline in the vessel began to vaporize from the surface of the carbon and aluminum oxide. These conditions are indicated at the point C in FIG. 2. When the gasoline vapor passes through the condenser 37, its temperature is reduced to a temperature above the boiling point of the gasoline and the gasoline liquid flows through the pump 16. The gasoline in liquid state then passed through the conduit 21 and the condenser 22 and into the tank 52.

After a period of time, when substantially all of the gasoline had been withdrawn from the tank, the valve 15 was closed, and the vessel 6 was ready to begin another cycle. When the absorbent material in the vessel 6' became saturated with the gasoline, as determined by the detecting device 50', the valves 3' and 10' were closed, and the process was repeated for the vessel 6', as previously described with respect to the vessel 6.

While the invention has been described with preferred embodiments, it is to be understood that variations and modifications may be resorted to as well as be apparent to those skilled in the art. Such variations and modifications are to be considered within the purview and scope of the claims appended hereto.

What is claimed is:

1. A process for the recovery of gasoline from a stream of air laden with gasoline comprising:
   providing at least one vessel containing a mixture of adsorbent material for said gasoline and an inert, high heat capacity material;
   passing a stream of air laden with gasoline through an inlet conduit into said vessel to selectively adsorb substantially all of said gasoline in said mixture, the temperature in said vessel being below the vaporization temperature of said gasoline, the remainder of said air stream passing out of said vessel through an outlet conduit;
   closing said inlet and outlet conduits;
   heating the interior of said vessel at about atmospheric pressure to a temperature below the vaporization temperature of the gasoline but above the vaporization temperature at a selected lower pressure;
   drawing a vacuum in said vessel to said selected lower pressure, the said high heat capacity material maintaining the temperature of said mixture above the vaporization temperature of the gasoline at the said selected lower pressure whereby substantially all of the adsorbed gasoline is vaporized from the said mixture, while withdrawing gasoline vapor from said vessel.

2. The process of claim 1 wherein said adsorbent material is activated charcoal and said inert high heat capacity material is aluminum oxide.

3. The process of claim 1 wherein said heating step maintains a temperature in said vessel of about 260° F at about atmospheric pressure.

4. The process of claim 3 wherein said vaccuum drawing step reduces the pressure in the vessel to about 70 millimeters of mercury absolute.

5. The process of claim 1 wherein said vacuum drawing step includes providing a vacuum pump and a pipe from said vessel to said pump, and includes condensing said gasoline in said pipe between said pump and said vessel.

6. The process of claim 5 including sealing said pump with gasoline from said condensing step, and collecting said gasoline on the outlet side of said pump.

7. The process of claim 1 including measuring the quantity of gasoline in the air stream passing through said outlet conduit, and said closing step occurring in response to measurement of a predetermined quantity of gasoline in said air stream.

8. The process according to claim 1 including circulating any air in the vessel when said conduits are closed through said vessel during said heating step.

9. A process for the recovery of gasoline or halogenated hydrocarbons of the type having a boiling point that varies in direct proportion to pressure comprising:
   adsorbing said gasoline or halogenated hydrocarbon on a bed of adsorbent material from a stream of air laden with said gasoline or chlorinated hydrocarbon, the bed further containing an inert, high heat capacity material intimately mixed with said adsorbent material;
   providing an enclosure for said bed;
   heating the interior of said enclosure at substantially atmospheric pressure;
   reducing the pressure in said enclosure while maintaining the temperature in the enclosure above the vaporization temperature at the reduced pressure;
   withdrawing air laden with gasoline or halogenated hydrocarbon vapor from the enclosure while maintaining the temperature in the enclosure; and
   subsequently separating the gasoline or halogenated hydrocarbon from the air withdrawn from the enclosure.

10. The process according to claim 9 wherein said adsorbent material is activated charcoal, and said heating step includes conducting steam through a coil embedded in the adsorbent material.

11. The process according to claim 8 wherein said separating step includes condensing said vapor and said withdrawing step including passing from said enclosure through a vacuum pump.

12. The process according to claim 10 including providing a pump having a liquid ring seal and using the liquid condensate as a liquid seal for the pump.

13. Apparatus for recovering gasoline or halogenated hydrocarbons from an air stream containing these materials, said apparatus comprising:
   an enclosed vessel having an inlet conduit and an outlet conduit;
   a bed including a mixture of an adsorbent material for gasoline or halogenated hydrocarbons and an inert, high heat capacity material in said vessel between said inlet and outlet conduits;
   pump means communicating with said vessel for selectively withdrawing air and vapor from said vessel;
   first valve means in said inlet conduit for controlling flow of vapor laden air from a source to said inlet conduit;
   second valve means for controlling the flow of air from said vessel to the atmosphere; and
   container means for collecting the gasoline or halogenated hydrocarbons after passing through said pump.

14. The apparatus of claim 13 further including a return conduit between said inlet conduit and said outlet conduit, said return conduit cooperating with said first and second valve means to allow circulation of air through said vessel when said first valve means is closed to prevent air from said source to enter said inlet conduit and said second valve means is closed to present air from falling from said outlet conduit to the atmosphere.

15. The apparatus of claim 14 including detecting means for closing said second valve means when the proportion of gasoline or halogenated hydrocarbons blowing through said valve means exceeds a predetermined value.

16. The apparatus of claim 13 wherein said pump is of the liquid seal type.

17. The apparatus of claim 14 wherein a second vessel having substantially the same structure and component as the first mentioned vessel; and valve means for alternately drawing a vacuum in said first vessel and said second vessel by said pump means.

18. A process for the recovery of a solvent from a stream of solvent laden air comprising:

providing at least one vessel containing a mixture of adsorbent material for said solvent and an inert, high heat capacity material;

passing a stream of solvent laden air through an inlet conduit into said vessel to selectively adsorb substantially all of said solvent in said mixture, the temperature in said vessel being below the vaporization temperature of said solvent at the pressure maintained therein, the remainder of said air stream passing out of said vessel through an outlet conduit;

closing said inlet and outlet conduits;

heating the interior of said vessel at about atmospheric pressure to a temperature below the vaporization temperature of the solvent at atmospheric pressure but above the vaporization temperature of said solvent at a selected lower pressure;

drawing a vacuum in said vessel to said selected lower pressure, the said high heat capacity material maintaining the temperature of said mixture above the vaporization temperature of the solvent at said selected lower pressure whereby substantially all of the adsorbedt solvent is vaporized from said mixture;

withdrawing vapors of said solvent from said vessel.

19. The process of claim 18 wherein the interior of said vessel is thereafter cooled to ambient temperature or below.

20. Process of claim 18 wherein the said solvent is gasoline or a chlorinated hydrocarbon, the adsorbent material is activated charcoal and said inert high heat capacity material is aluminum oxide.

21. The process of claim 18 wherein said vacuum drawing step includes providing a liquid ring sealant type vacuum pump and a pipe from said vessel to said pump, the liquid ring sealant of said liquid sealant type of vacuum pump being the same liquid as said solvent and further wherein said solvent is condensed in said pipe between said pump and said vessel.

22. The process of claim 21 further including measuring the quantity of solvent in the air stream passing through said outward conduit, said closing step occurring in response to measurement of a predetermined quantity of solvent in said air stream.

23. The process of claim 18 wherein indirect heating coils are provided in said mixture for heating and cooling of said bed.

* * * * *